(12) United States Patent
Hintersteiner et al.

(10) Patent No.: US 9,544,831 B2
(45) Date of Patent: Jan. 10, 2017

(54) SYSTEM AND METHOD FOR NETWORK USER ISOLATION

(71) Applicant: Spot On Networks LLC, New Haven, CT (US)

(72) Inventors: Jason Hintersteiner, Norwalk, CT (US); Richard Sherwin, Guilford, CT (US); Tom Doyle, New Haven, CT (US)

(73) Assignee: Spot On Networks LLC, New Haven, CT (US)

( * ) Notice: Subject to any disclaimer, the term of this patent is extended or adjusted under 35 U.S.C. 154(b) by 96 days.

(21) Appl. No.: 14/317,877

(22) Filed: Jun. 27, 2014

(65) Prior Publication Data

US 2014/0307626 A1   Oct. 16, 2014

Related U.S. Application Data

(63) Continuation-in-part of application No. 14/020,489, filed on Sep. 6, 2013.

(60) Provisional application No. 61/698,234, filed on Sep. 7, 2012, provisional application No. 61/856,396, filed on Jul. 19, 2013.

(51) Int. Cl.
| | |
|---|---|
| *H04W 4/00* | (2009.01) |
| *H04W 48/02* | (2009.01) |
| *H04W 16/10* | (2009.01) |
| *H04W 52/24* | (2009.01) |
| *H04W 84/16* | (2009.01) |

(52) U.S. Cl.
CPC .............. *H04W 48/02* (2013.01); *H04W 16/10* (2013.01); *H04W 52/243* (2013.01); *H04W 84/16* (2013.01)

(58) Field of Classification Search
CPC ....... H04W 80/04; H04W 88/06; H04W 88/08; H04W 84/18; H04L 29/06
See application file for complete search history.

(56) References Cited

U.S. PATENT DOCUMENTS

| | | | |
|---|---|---|---|
| 5,642,122 A | 6/1997 | Lockie et al. | |
| 7,031,266 B1* | 4/2006 | Patel | H04L 45/02 370/254 |
| 7,406,051 B2 | 7/2008 | Khun-Jush et al. | |
| 8,280,444 B1 | 10/2012 | Shen et al. | |
| 8,305,921 B2 | 11/2012 | Narasimhan et al. | |

(Continued)

OTHER PUBLICATIONS

Cisco, Linksys E-Series Routers, User Guide, 2011, 8pgs.

*Primary Examiner* — Maharishi Khirodhar
*Assistant Examiner* — Sanjay K Dewan
(74) *Attorney, Agent, or Firm* — Duane Morris LLP

(57) ABSTRACT

A communications network for providing communications for Group 1 Users, Group 2 Users and a plurality of digitally-controlled appliances is disclosed. Said communications network includes a first switch operatively connected to a server, a router, a second switch, and a third switch. Said second switch is operatively connected to a first access point and a second access point. Said third switch is operatively connected to a third access point and a fourth access point. Said first access point is wirelessly connected to Device A, said second access point is wirelessly connected to Device B, said third access point is wirelessly connected to Device C. Said fourth access point is programmed to allow communications between User F wirelessly connected to said fourth access point and any said Group 1 Users, any said Group 2 Users, any of said plural appliances, said server, and said router.

30 Claims, 10 Drawing Sheets

(56) References Cited

U.S. PATENT DOCUMENTS

| | | |
|---|---|---|
| 8,744,352 B2* | 6/2014 | Pochop, Jr. ............ H04W 16/18 |
| | | 455/41.1 |
| 2004/0165548 A1 | 8/2004 | Backes |
| 2007/0201540 A1* | 8/2007 | Berkman ................ H04B 3/542 |
| | | 375/219 |
| 2008/0089277 A1* | 4/2008 | Alexander .......... H04L 12/2816 |
| | | 370/328 |
| 2010/0008230 A1* | 1/2010 | Khandekar ........... H04W 16/10 |
| | | 370/237 |
| 2010/0085884 A1 | 4/2010 | Srinivasan et al. |
| 2011/0032849 A1* | 2/2011 | Yeung ................. H04B 7/0434 |
| | | 370/280 |
| 2011/0034192 A1 | 2/2011 | Lim et al. |
| 2011/0090885 A1 | 4/2011 | Safavi |
| 2012/0129559 A1* | 5/2012 | Pochop, Jr. ............ H04W 16/18 |
| | | 455/507 |
| 2015/0016561 A1 | 1/2015 | Negus et al. |
| 2015/0029906 A1 | 1/2015 | Jana et al. |

* cited by examiner

SYSTEM AND METHOD FOR NETWORK USER ISOLATION

RELATED AND CO-PENDING APPLICATIONS

This application is a continuation-in-part of co-pending U.S. application Ser. No. 14/020,489 filed 6 Sep. 2013 entitled "System and Method for Wireless Access Point Layout and Network Operation", which claims priority to U.S. provisional application 61/698,234 filed 7 Sep. 2012 entitled "System and Method for Wireless Access Point Layout and Network Operation", the entirety of each is hereby incorporated herein by reference. This application also claims priority to U.S. provisional application 61/856,396 filed 19 Jul. 2013 entitled "System and Method for Wireless Access Point Layout and Network Operation", the entirety of which is hereby incorporated herein by reference.

BACKGROUND

Current systems and methods for deploying and/or operating a wireless communication network in a private residential neighborhood or a multi-unit building generally rely on placing a wireless router (e.g., access point) in each individual unit. As used herein, multi-unit buildings may be single floor or multi-floor buildings, and include buildings containing apartments, offices, condominiums, dormitories, etc., as well as referring to buildings such as hotels, motels, inns, shopping malls, and similar structures. One of the problems with the approach used by current methods is that wireless routers are typically designed to provide coverage of an area that is much larger than an individual unit. Consequently, there is significant bleed over of signals into neighboring units, both on the same floor and on neighboring floors. Such an arrangement compromises the privacy and security of the user of a unit's router and may also lead to interference between the wireless routers used in different units.

Furthermore, if a unit's user (i.e., the owner, renter, resident, office worker, guest, etc.) has a wireless device in his unit (e.g., a wirelessly-controlled thermostat, refrigerator, light, or other similar appliance or device) which he controls from his mobile apparatus (e.g., cell phone, laptop, wireless electronic tablet, etc.) his control of that wireless device may be partially or totally impaired once the user exits the coverage area (e.g., "cell") of his unit's particular access point ("AP").

Additionally, there is a need to prevent one user from seeing a neighboring user while still allowing each of the users to access authorized networks (e.g., a server and/or a router to the internet) as well as allowing each user to access only his/her authorized wireless devices (e.g., user A can access his wireless thermostat but cannot access user B's thermostat). Moreover, it would be advantageous for each user to access his/her authorized wireless devices from a location that is outside of the range of his unit's particular AP. On top of all this, the building owner may desire to operate a network separate from the user network such that the building owner can access the internet and/or a server and any user and/or any user's wireless device while the users are prevented from accessing anyone other than the building owner's designated representative (e.g., a system operator).

Accordingly, there is a need for a solution to the problems described above associated with current methods for deploying and/or operating a wireless network in a multi-unit building.

DETAILED DESCRIPTION

The following description of the present subject matter is provided as an enabling teaching of the present subject matter and its best, currently-known embodiment. Those skilled in the art will recognize that many changes can be made to the embodiments described herein while still obtaining the beneficial results of the present subject matter. It will also be apparent that for some embodiments, some of the desired benefits of the present subject matter can be obtained by selecting some of the features of the present subject matter without utilizing other features. Accordingly, those skilled in the art will recognize that many modifications and adaptations of the present subject matter are possible and may even be desirable in certain circumstances and are part of the present subject matter. Thus, the following description is provided as illustrative of the principles of the present subject matter and not in limitation thereof and may include modification thereto and permutations thereof. While the following exemplary discussion of embodiments of the present subject matter may be directed towards or reference specific devices and/or methodologies, it is to be understood that the discussion is not intended to limit the scope of the present subject matter in any way and that the principles presented are equally applicable to other devices and/or methodologies.

Those skilled in the art will further appreciate that many modifications to the exemplary embodiments described herein are possible without departing from the spirit and scope of the present subject matter. Thus, the description is not intended and should not be construed to be limited to the examples given but should be granted the full breadth of protection afforded by the appended claims and equivalents thereto.

With reference to the figures where like elements have been given like numerical designations to facilitate an understanding of the present subject matter, various embodiments of a system and method for wireless access point layout and network operation are described.

Figure 1:
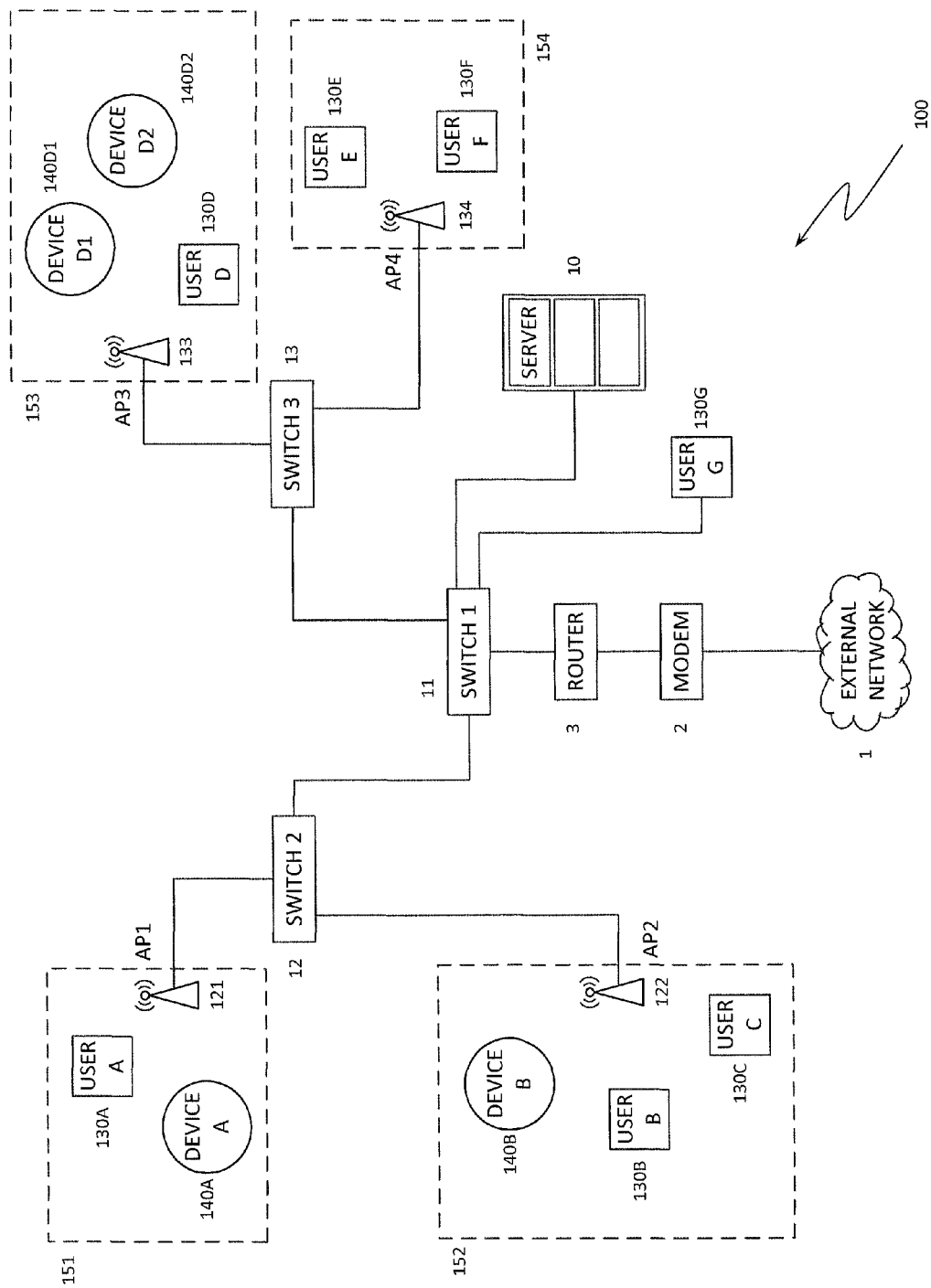
FIG. 1 is a block diagram for a topology of an exemplary prior art network.

The present disclosure describes novel systems and methods for deploying and operating a wireless network in a multi-unit building. With attention drawn to FIG. 1, a block diagram for the topology of an exemplary prior art network 100 is depicted. The network 100 connects to external network 1 (such as a wide area network, an enterprise network, the internet, or other similar network) via modem 2 and router 3, as is known in the art. The exemplary network 100 includes switches switch 1 (11), switch 2 (12), and switch 3 (13), connected as shown. Connected to switch 2 are AP1 (121) and AP2 (122). Connected to switch 3 are AP3 (133) and AP4 (134). Server 10 for network 100 is connected to switch 1 as shown. Those of skill in the art will readily understand that the topology depicted in FIG. 1 is exemplary only and in no way limits the scope of the disclosure.

AP1 services unit 151 in which user A has a mobile apparatus 130A and wireless device A (140A), such as a wirelessly-controlled appliance. AP1 also services one or more units adjacent to unit 151 (not shown for clarity). AP2 services unit 152 in which user B has a mobile apparatus 130B and wireless device B (140B). Additionally, unit 152 includes user C who has a mobile apparatus 130C. AP2 also services one or more units adjacent to unit 152 (not shown for clarity). Similarly, AP3 services unit 153 in which user D has a mobile apparatus 130D and wireless device D1 (140D1) and wireless device D2 (140D2). AP3 also services one or more units adjacent to unit 153 (not shown for clarity). Likewise, AP4 services unit 154 in which user E has a mobile apparatus 130E. Additionally, unit 154 includes user F who has a mobile apparatus 130F. AP4 also services one or more units adjacent to unit 154 (not shown for clarity).

User G, in the depicted topology of exemplary network 100, is hard-wired into switch 1 (11) although user G may also be connected via a wireless link. User G represents typical network administration users such as one or more of a network administrator, supervisor, building maintenance, etc.

In conventional private residential neighborhoods or multi-dwelling units, each unit typically has a dedicated AP which may interfere with and/or bleed over to a neighboring unit thereby inviting privacy and security problems. To combat this, the conventional approach is to employ an encryption key for each AP. While this may be an effective answer to the security problem, it does nothing to overcome the privacy problem since users in neighboring units will still be able to see all other connected users on that network.

Unlike most private residential or multi-dwelling unit networks, it is desirable in the multi-dwelling unit space to prevent neighboring users from seeing each other while still allowing each user appropriate access to certain services and/or devices (the internet, a shared server, a particular wireless device or devices which only a specific user can control, etc.) Furthermore, it is desirable to have user isolation be user-dependent rather than being location-dependent. In other words, a given user should be able to have the ability to control his/her specific wireless thermostat through any connection in the multi-dwelling unit network and not only when connected to the AP that services his/her specific dwelling unit.

Figure 2:
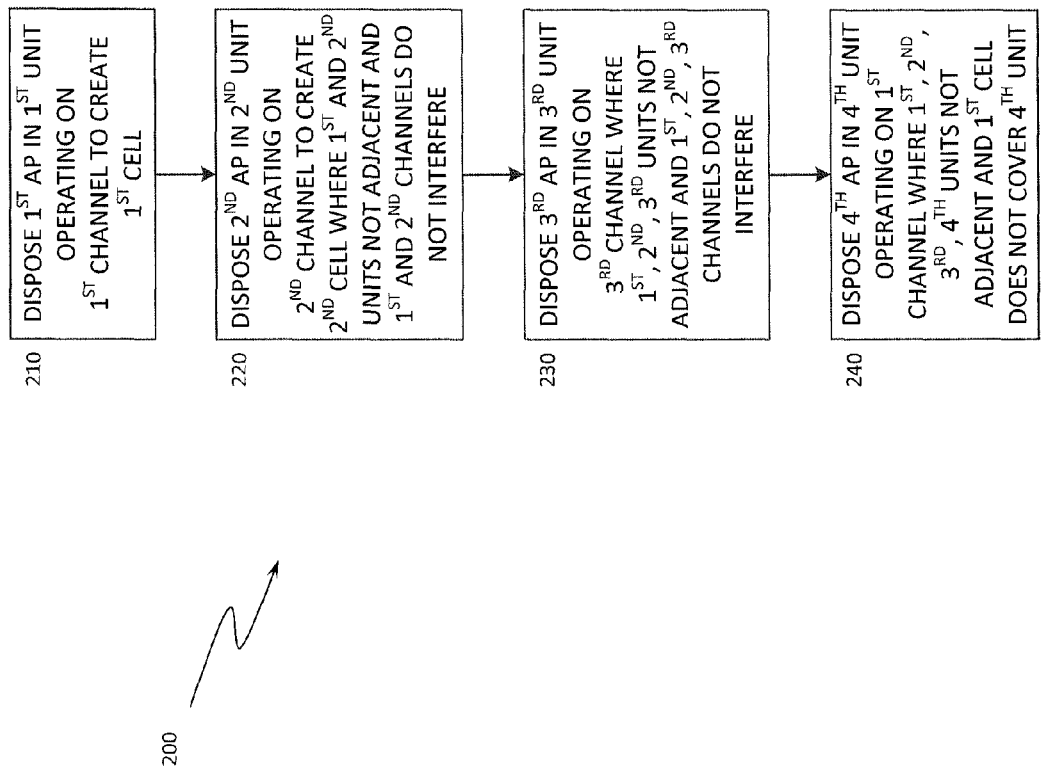
FIG. 2 is a flow chart for creating a wireless network according to an embodiment of the present subject matter.

Now turning to FIG. 2, a flow chart 200 is shown for creating and/or deploying a wireless network according to an embodiment of the present subject matter that will address both the security and privacy issues of the prior art.

At block 210, a first access point operating on a first channel of a predetermined set of channels is disposed in a first unit to create a first wireless cell. The first wireless cell provides wireless coverage to the first unit and to a unit adjacent to the first unit. At block 220, a second access point operating on a second channel of the predetermined set of channels is disposed in a second unit, which is not adjacent (either horizontally or vertically) to the first unit, to create a second wireless cell. The second wireless cell provides wireless coverage to the second unit and to a unit adjacent to the second unit. The second channel is chosen so as to not interfere with the first channel.

At block 230, a third access point operating on a third channel of the predetermined set of channels is disposed in a third unit, which is not adjacent (either horizontally or vertically) to either of the first or the second unit, to create a third wireless cell. The third wireless cell provides wireless coverage to the third unit and to a unit adjacent to the third unit. The third channel is chosen so as to not interfere with the first or the second channel. At block 240, a fourth access point operating on the first channel of the predetermined set of channels is disposed in a fourth unit, which is not adjacent (either horizontally or vertically) to either of the first, second, or third unit, to create a fourth wireless cell. The fourth wireless cell provides wireless coverage to the fourth unit and to a unit adjacent to the fourth unit. Furthermore, the first wireless cell does not provide wireless coverage to either of the fourth unit or to the unit adjacent to the fourth unit which is served by the third access point.

In this manner, fewer APs need to be deployed to cover all of the units in the multi-unit building. The above process may be repeated as necessary to ensure each unit, as desired, in the multi-unit building is serviced by adequate wireless coverage.

Further enhancements to the above deployment embodiment are also contemplated. In an embodiment, the first AP may operate at a first selected power level while the second AP operates at a second power level that is determined based on an interference measurement in the second unit due to the wireless signal from the first wireless cell. In a further embodiment, the third AP operates at a third power level that is determined based on an interference measurement in the third unit due to the wireless signals from the first and second wireless cells.

In yet another embodiment, which may be a further enhancement to any of the above-described deployment strategies, the first, second, and third APs may each have the capability to transmit a wireless signal according to a configurable antenna beam pattern. In this embodiment, the first AP may operate using a first selected antenna beam pattern while the second AP operates using a second antenna beam pattern that is determined based on an interference measurement in said second unit due to the wireless signal from the first wireless cell. In still another embodiment, the third AP operates using a third antenna beam pattern that is determined based on an interference measurement in the third unit due to the wireless signals from the first and second wireless cells.

In other embodiments, the first and second units are on a same level of a multi-unit building and/or at least one of the first, second, third, and fourth units are on a first floor of a multi-unit building and the other(s) of the first, second, third, and fourth units are on a second floor of the multi-unit building.

In still other embodiments, the first and second wireless cells provide wireless coverage to the second unit and/or the first, second, and third wireless cells provide coverage to the first unit.

Figure 3:
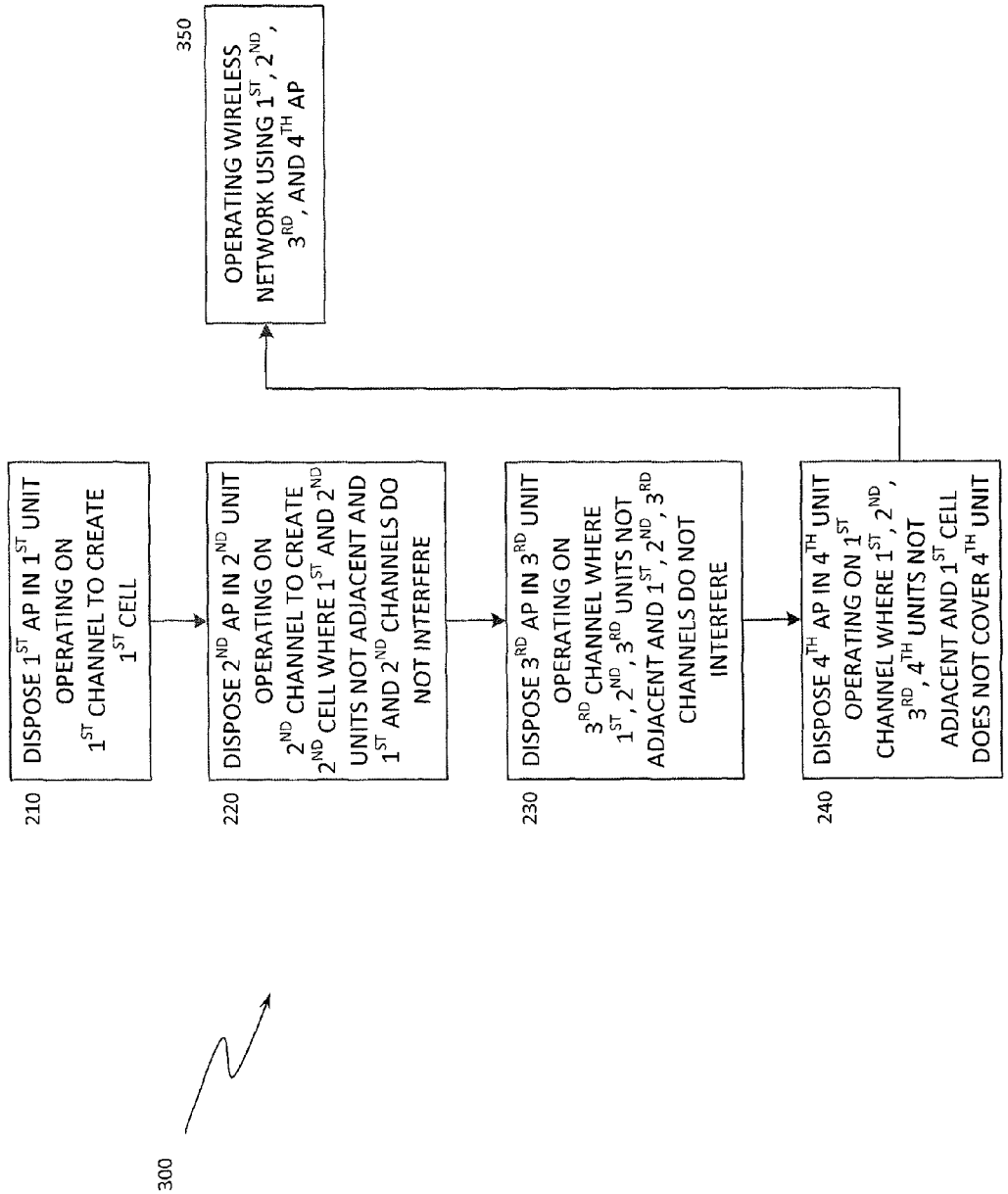
FIG. 3 is a flow chart for creating and operating a wireless network according to another embodiment of the present subject matter.

FIG. 3 illustrates a flow chart 300 for creating and operating a wireless network according to another embodiment of the present subject matter. In FIG. 3, blocks 210, 220, 230, and 240 are as described above with respect to FIG. 2 for creating and/or deploying a wireless network including the first, second, third, and fourth APs. At block 350, the wireless network that was created and/or deployed is operated using the first, second, third, and fourth APs.

Figure 4:
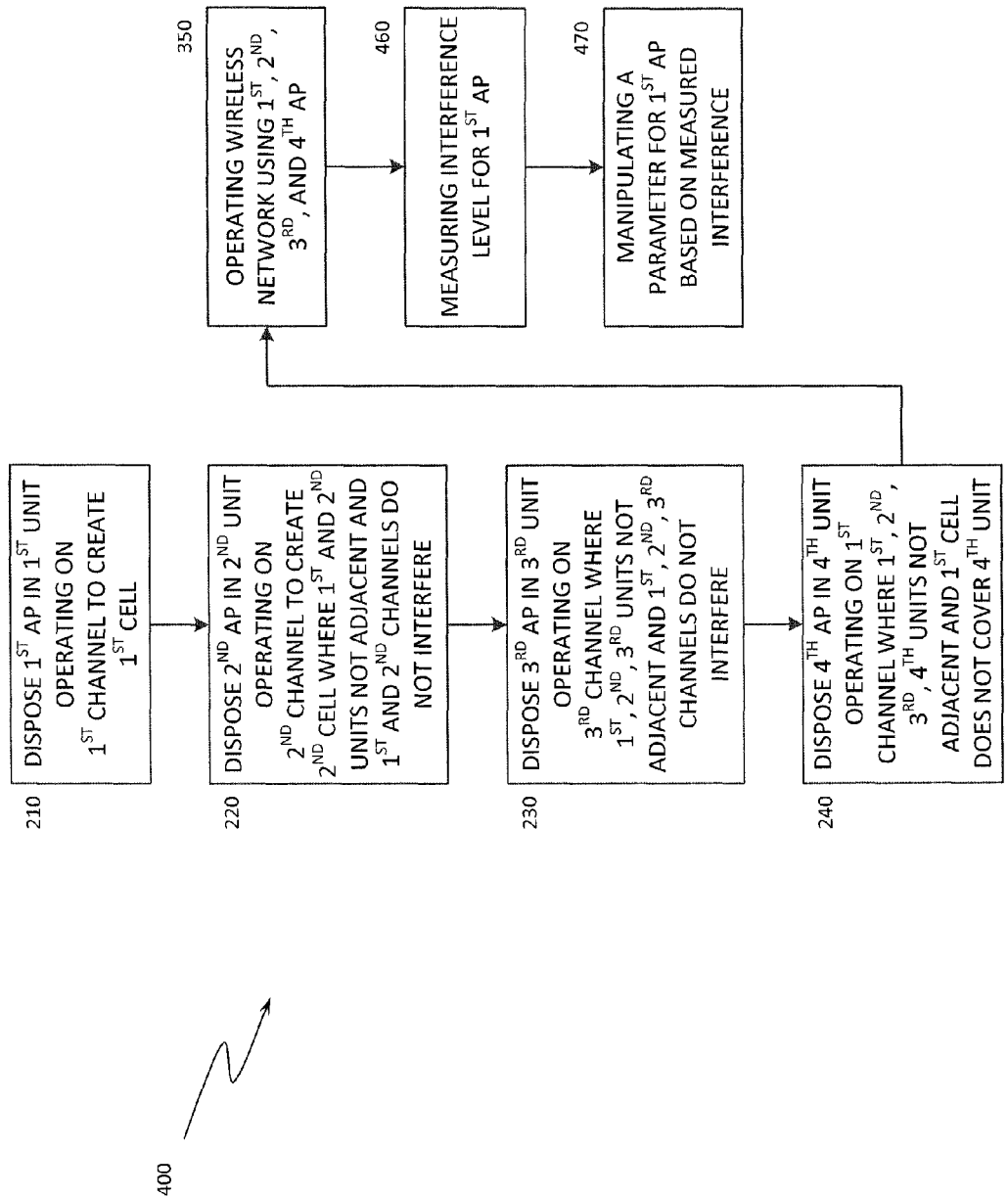
FIG. 4 is a flow chart for creating and operating a wireless network according to yet another embodiment of the present subject matter.

Considering FIG. 4, a flow chart 400 is shown for creating and operating a wireless network according to yet another embodiment of the present subject matter. In FIG. 4, blocks 210, 220, 230, 240, and 350 are as described above with respect to FIG. 3 for creating and operating a wireless network including the first, second, third, and fourth APs. At block 460, an interference level for the first AP is measured. At block 470, at least one parameter of the first AP is manipulated based on the measured interference level for the first AP. The parameters that may be manipulated include antenna beam pattern, communication channel selection, and output power level. Therefore, the wireless network will be able to operate without undue interference amongst the various APs while maintaining the privacy desired by the network users.

Figure 5:
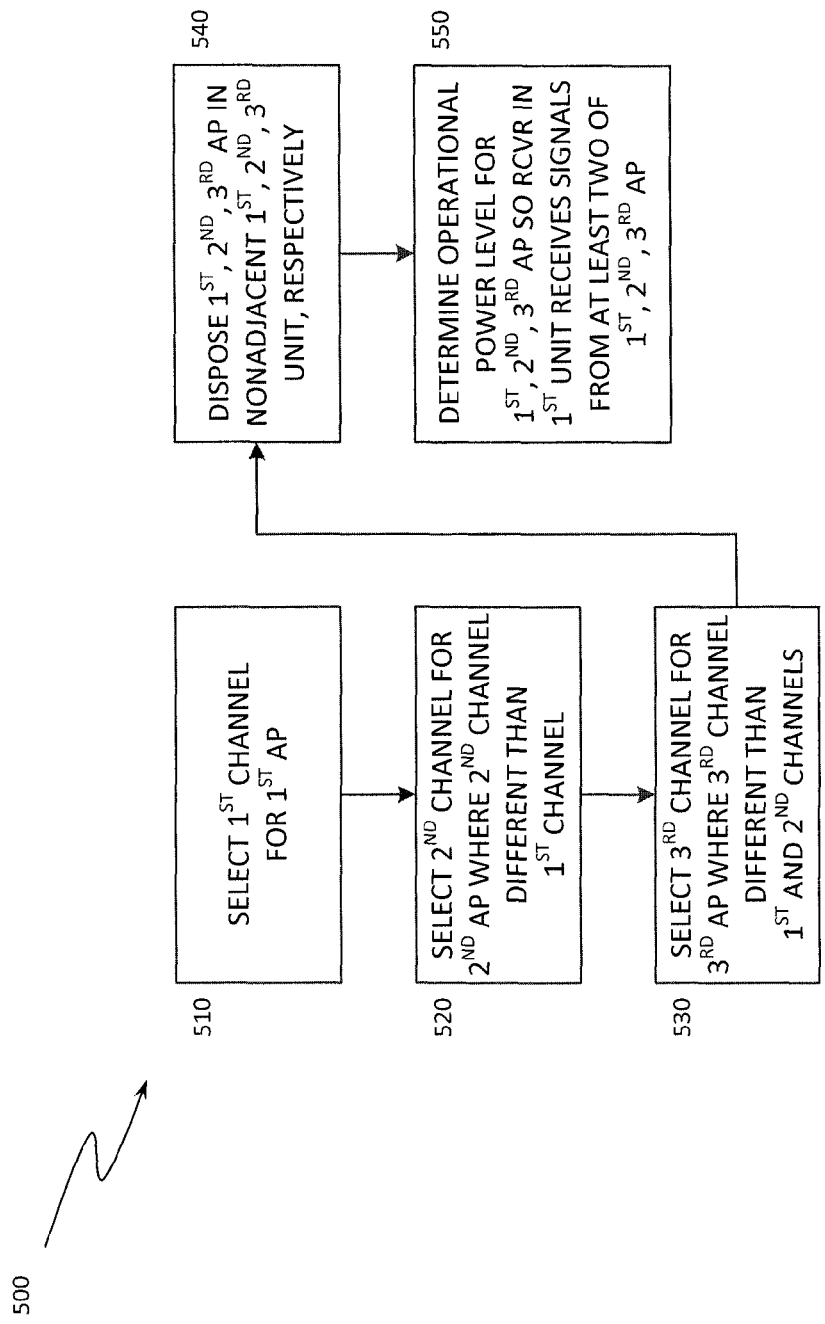
FIG. 5 is a flow chart for deploying a wireless network according to an embodiment of the present subject matter.

Now considering FIG. 5, a flow chart 500 is presented for deploying a wireless network according to an embodiment of the present subject matter. At block 510, a first communication channel is selected for a first AP where the first communication channel is selected from a predetermined set of communication channels. At block 520, a second communication channel is selected for a second AP where the second communication channel is selected from the same predetermined set of communication channels. Additionally, the second communication channel selected is different from the first communication channel selected. At block 530, a third communication channel is selected for a third AP where the third communication channel is selected from the same predetermined set of communication channels. Additionally, the third communication channel selected is different from the first and second communication channels selected.

At block 540, the first, second, and third APs are deployed in a first, second, and third unit, respectively, in a multi-unit building where each of the first, second, and third units is not adjacent to either of the other two units. At block 550, for each of the first, second, and third APs, a respective operational power level is determined such that a receiver disposed in the first unit can receive communication signals from at least two of the first, second, and third APs. Thus, a user in the first unit can receive wireless communication signals from multiple, non-interfering APs. In a further embodiment, an antenna beam pattern for at least one of the first, second, and third APs may be manipulated as necessary to ensure adequate wireless coverage while maintaining user privacy.

In other embodiments, the wireless network of FIG. 5 is deployed in a multi-story, multi-unit building. In a further embodiment, each of the first, second, and third units is not adjacent to either of the other two units, either horizontally or vertically. In still a further embodiment, the step of disposing the first, second, and third APs in FIG. 5 occurs after the selection of the first, second, and third communication channels. In yet a further embodiment, the first access point is disposed in a hallway adjacent to the first unit.

Figure 6:
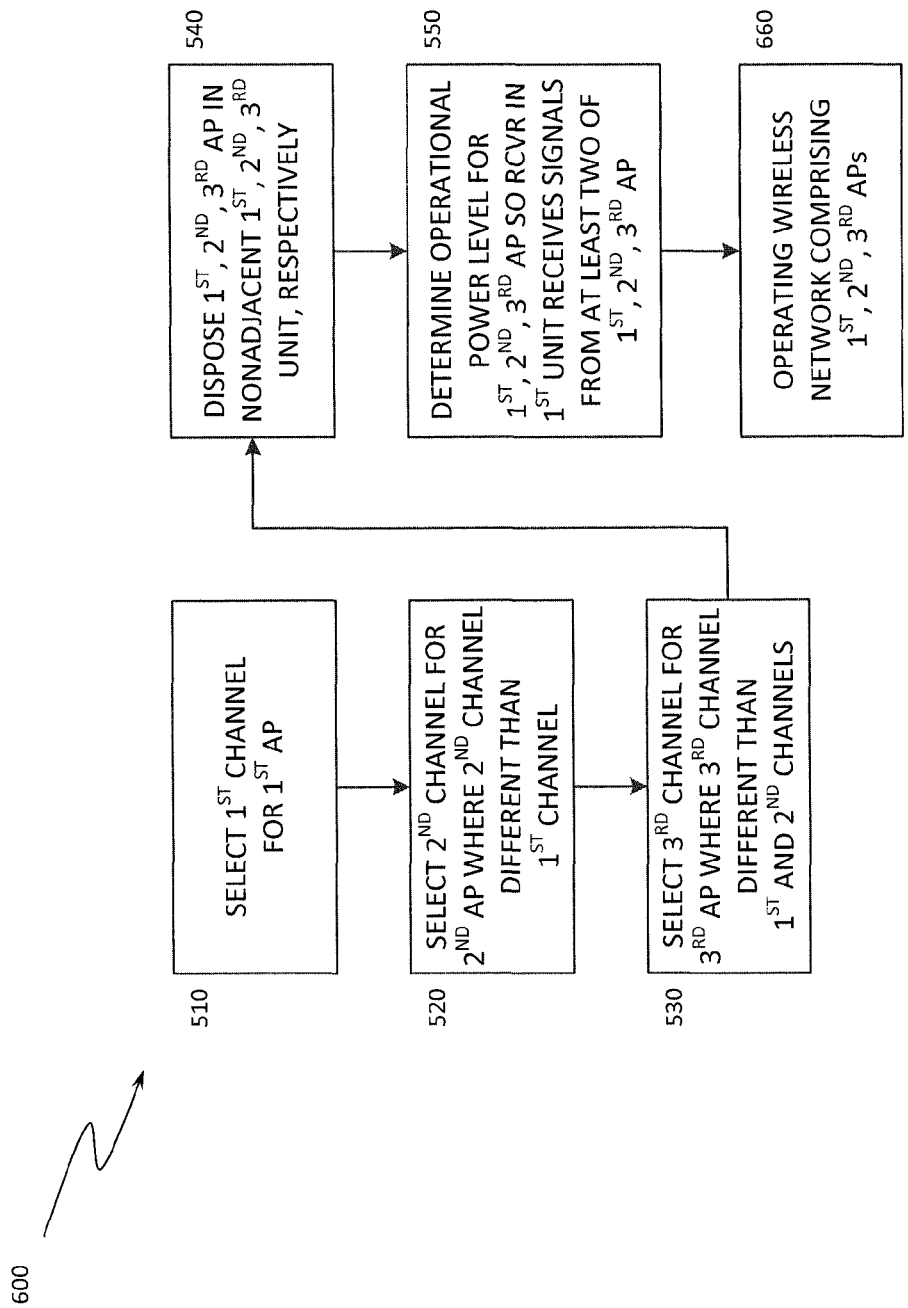
FIG. 6 is a flow chart for deploying and operating a wireless network according to another embodiment of the present subject matter.

FIG. 6 shows a flow chart 600 for deploying and operating a wireless network according to another embodiment of the present subject matter. In FIG. 6, Blocks 510, 520, 530, 540, and 550 are as described above with respect to FIG. 5. At block 660, the wireless network that was deployed is operated using the first, second, and third APs.

Figure 7:
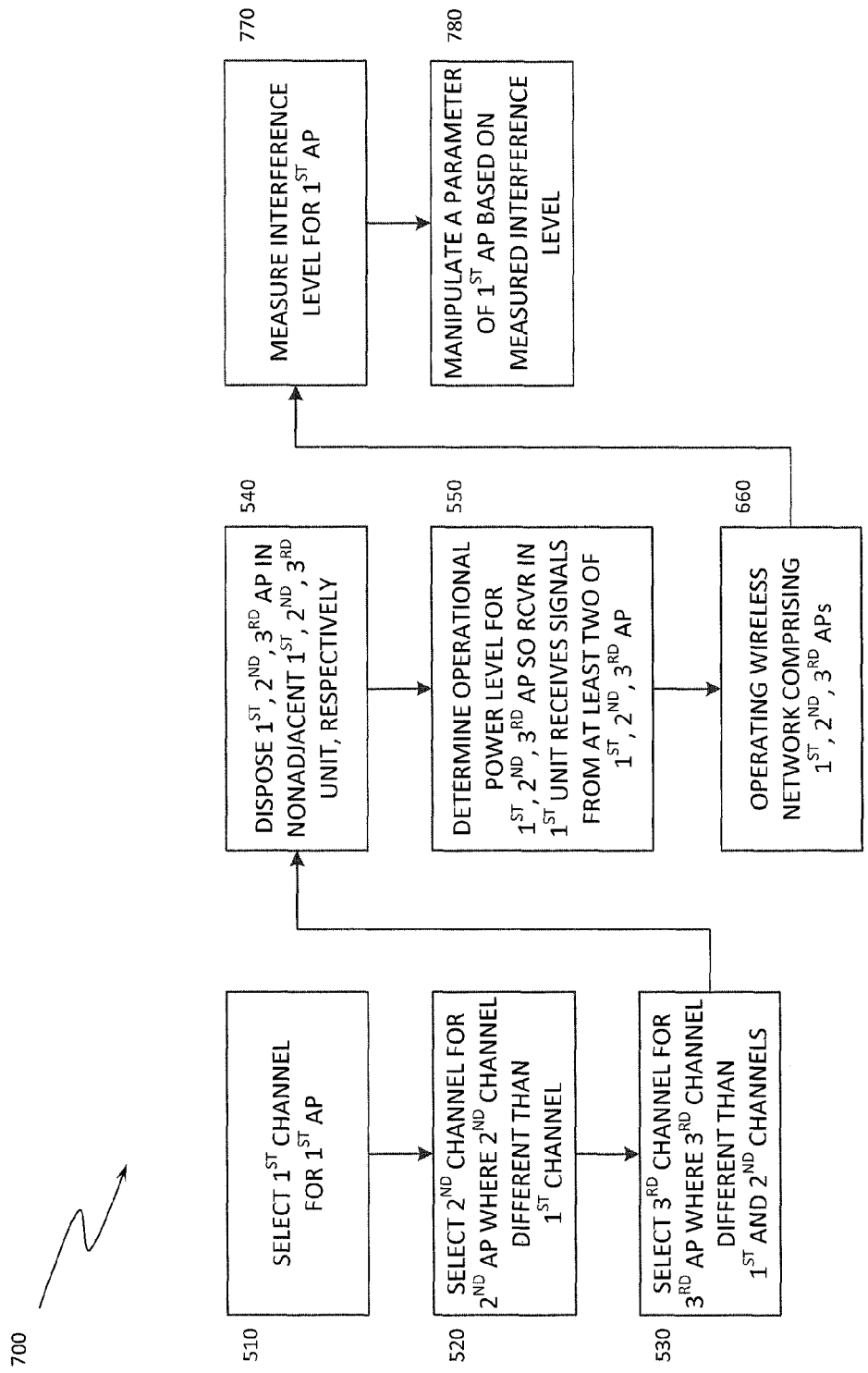
FIG. 7 is a flow chart for deploying a wireless network according to yet another embodiment of the present subject matter.

FIG. 7 depicts a flow chart 700 for deploying a wireless network according to yet another embodiment of the present subject matter. In FIG. 7, Blocks 510, 520, 530, 540, 550, and 660 are as described above with respect to FIG. 6. At block 770, an interference level for the first AP is measured. At block 780, based on the measured interference level for the first AP, at least one parameter of the first AP is manipulated where the parameter is one or more of antenna beam pattern, communication channel selection, and output power level.

In a further embodiment regarding FIG. 7, the steps of selecting the first, second, and third communication channels are accomplished prior to operating the wireless communication network.

Most modern networks require that the same physical network be used by different parties that require different access rights. An example of this is a hotel wired and wireless network that is used by both hotel guests and hotel staff. The hotel guests need to be isolated from each other as well as from hotel staff network equipment, whereas hotel staff need to be able to inter-communicate with each other as well as in-house server and client equipment for the enterprise, such as thermostats, as well as having the ability, for at least someone on the staff, to communicate with the hotel guests. In an embodiment, this may be accomplished by using a combination of virtual local area networks ("VLANs"), access control list rules, and station isolation.

For example, for a network for hotel guests, the guest network is placed on its own VLAN associated with a particular service set identifier ("SSID"). This SSID would generally be open to allow any guest and, in an embodiment, one or more hotel staff, to access the guest network. In a certain embodiment, the guest network would have an encryption key, such as a WEP/WPA-TKIP/WPA2-AES key, as is known in the art, that is provided by the hotel/network owner. The station isolation rules for the access points in the guest network are turned on for this SSID, and the range of IPv4 and/or IPv6 addresses assigned to users on the guest network preclude certain inter-communication, such as, but not limited to, communication between guest users and/or between a first guest user and a device that is associated with a second guest.

Continuing with the above example, a network for the hotel staff is placed on its own VLAN associated with a different SSID than the SSID associated with the guest network. The staff network SSID would generally have an encryption key, such as a WEP/WPA-TKIP/WPA2-AES key, or WPA2-EAP, as is known in the art, with authentication provided by, for example, a standalone RADIUS server, to thereby prevent guests and other unauthorized users from associating with the staff network. The station isolation rules for the access points on the guest network are disabled and the range of IPv4 and/or IPv6 addresses assigned to users on the staff network allow certain inter-communication such as, but not limited to, communication between staff members and/or between a staff member and one or more devices associated with a particular guest's room (e.g., a unit's thermostat) and/or between a staff member (such as a system operator) and one or more guests.

Figure 8:
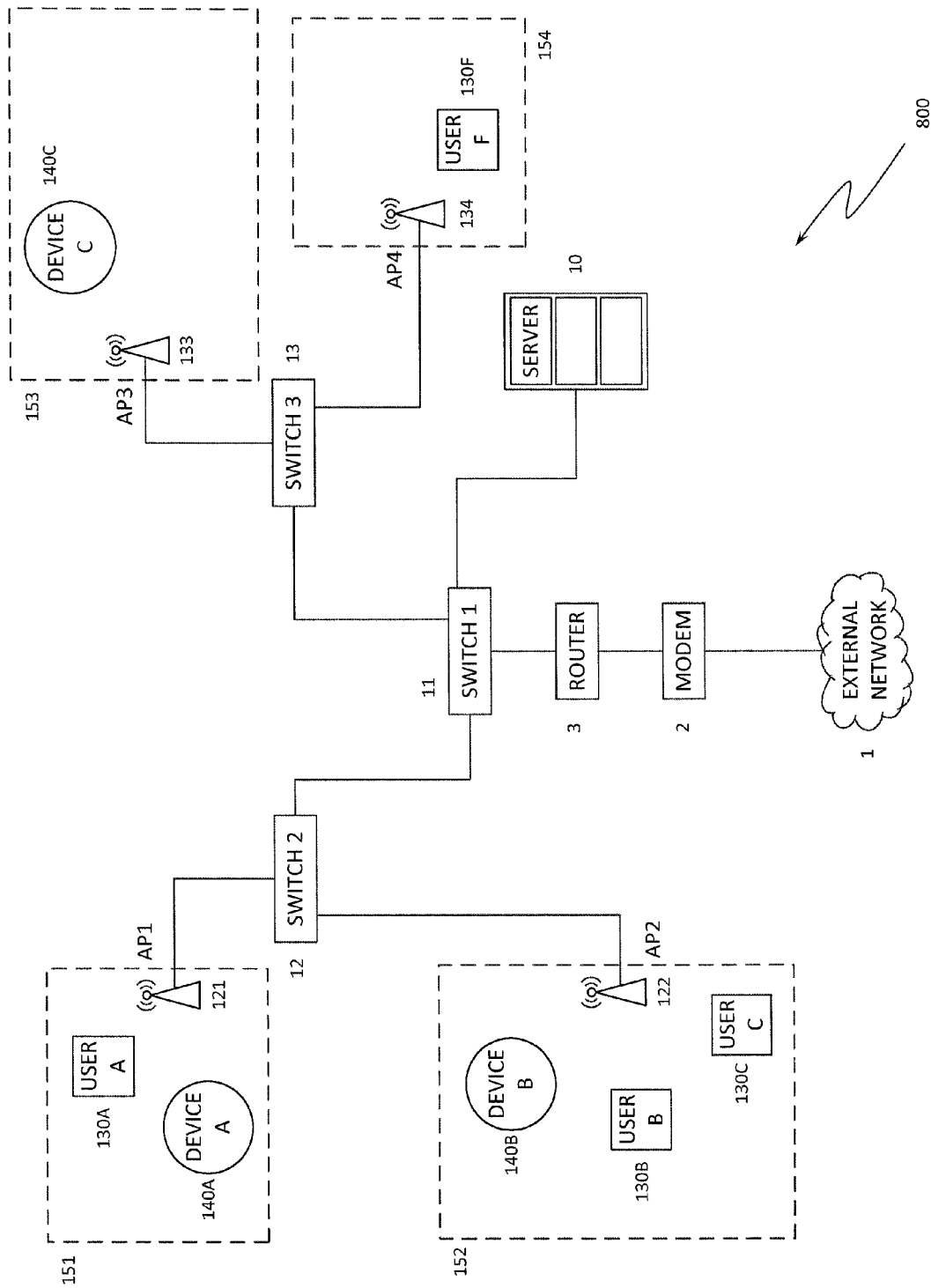
FIG. 8 is a block diagram for a topology of a communication network according to an embodiment of the present subject matter.

Considering FIG. 8, a block diagram is presented for a topology of a communication network 800 according to an embodiment of the present subject matter. The communication network 800 connects to external network 1 (such as a wide area network, an enterprise network, the internet, or other similar network) via modem 2 and router 3, as is known in the art. The exemplary communication network 800 includes switches switch 1 (11), switch 2 (12), and switch 3 (13), connected as shown. Connected to switch 2 are AP1 (121) and AP2 (122). Connected to switch 3 are AP3 (133) and AP4 (134). Server 10 for communication network 800 is connected to switch 1 as shown. Those of skill in the art will readily understand that the topology depicted in FIG. 8 is exemplary only and in no way limits the scope of the disclosure.

AP1 services unit 151 in which user A has a mobile apparatus 130A and wireless device A (140A), such as a wirelessly-controlled appliance. AP1 may also service one or more units adjacent to unit 151 (not shown for clarity) and/or a hallway adjacent unit 151. AP2 services unit 152 in which user B has a mobile apparatus 130B and wireless device B (140B). Additionally, unit 152 includes user C who has a mobile apparatus 130C. AP2 may also service one or more units adjacent to unit 152 (not shown for clarity) and/or a hallway adjacent unit 152. Similarly, AP3 services unit 153 which contains wireless device C (140C). AP3 may also service one or more units adjacent to unit 153 (not shown for clarity) and/or a hallway adjacent unit 153. Likewise, AP4 services unit 154 in which user F has a mobile apparatus 130F. AP4 also services one or more units adjacent to unit 154 (not shown for clarity) and/or a hallway adjacent unit 154.

The communication network 800 provides communication for users in a first group ("Group 1 Users") which, in an embodiment, are hotel guests or residents in a multi-dwelling unit building, and communication for users in a second group ("Group 2 Users") which, in an embodiment, are hotel staff or staff for the owner of a multi-dwelling unit building. In FIG. 8, Group 1 Users include User A (130A), User B (130B), and User C (130C). Those of skill in the art will understand that the present disclosure is not limited to just three Group 1 Users. Group 2 Users in FIG. 8 include User F (130F) and may include additional users not shown. Additionally, communication network 800 provides communication for various digitally-controlled wireless appliances such as, but not limited to, Device A (140A), Device B (140B), and Device C (140C).

The communication network 800 includes a first switch 11 connected to a server 10, a router 3, a second switch 12, and a third switch 13. The connections between these network components may be wired or wireless. Additionally, the second switch 12 is connected to a first access point 121 and a second access point 122, either by wire or wirelessly. The third switch 13 is connected to a third access point 133 and a fourth access point 134, either by wire or wirelessly.

The first access point 121 is wirelessly connected to a first wireless appliance Device A (140A) and the first access point 121 can be wirelessly connected to any Group 1 User within range and at least one Group 2 User within range. The first access point 121 is programmed to allow communications at least between each of the following: User A (130A) and Device A regardless of whether User A is wirelessly connected to the first access point 121; any Group 1 User wirelessly connected to the first access point 121 and the server 10 or the router 3; and User F (a Group 2 User) and (a) any Group 1 User wirelessly connected to the first access point 121, (b) any Group 2 User wirelessly connected to the first access point 121, and (c) Device A. Additionally, the first access point 121 is programmed to prevent communications between any two Group 1 Users (e.g., User A and User B) that are both wirelessly connected to the first access point 121.

The second access point 122 is wirelessly connected to a second wireless appliance Device B (140B) and the second access point 122 can be wirelessly connected to any Group 1 User within range and at least one Group 2 User within range. The second access point 122 is programmed to allow communications at least between each of the following: User B (130B) and Device B regardless of whether User B is wirelessly connected to the second access point 122; User C (130C) wirelessly connected to the second access point 122 and Device C (140C); any Group 1 User wirelessly connected to the second access point 122 and the server 10 or the router 3; and User F (a Group 2 User) and (a) any Group 1 User wirelessly connected to the second access point 122, (b) any Group 2 User wirelessly connected to the second access point 122, and (c) Device B. Additionally, the second access point 122 is programmed to prevent communications between any two Group 1 Users (e.g., User B and User C) that are both wirelessly connected to the second access point 122.

The third access point 133 is wirelessly connected to Device C (140C) and the third access point 133 can be wirelessly connected to any Group 1 User within range and at least one Group 2 User within range. The third access point 133 is programmed to allow communications at least between each of the following: User C (130C) and Device C regardless of whether User C is wirelessly connected to the third access point 133; any Group 1 User wirelessly connected to the third access point 133 and the server 10 or the router 3; and User F (a Group 2 User) and (a) any Group 1 User wirelessly connected to the third access point 133, (b) any Group 2 User wirelessly connected to the third access point 133, and (c) Device C. Additionally, the third access point 133 is programmed to prevent communications between any two Group 1 Users (e.g., User A and User C) that are both wirelessly connected to the third access point 133.

The fourth access point 134 is programmed to allow communications at least between User F (130F) when User F is wirelessly connected to the fourth access point 134 and (a) any Group 1 User, (b) any Group 2 User, (c) any of the wireless appliances attached to an access point on the communications network 800, (d) the server 10, or (e) the router 3.

In a further embodiment of the communications network 800, the second switch 12 is further programmed to allow communications at least between each of the following: User A and Device A; User B and Device B; User C and Device C; and User F and (a) any Group 1 User, (b) any Group 2 User, (c) any of the wireless appliances attached to an access point on the communications network 800, (d) the server 10, or (e) the router 3.

In a still further embodiment of the communications network 800, the second switch 12 is still further programmed to prevent communications between any two Group 1 Users. In yet a further embodiment, the third switch 13 is yet further programmed to allow communications at least between each of the following: User A and Device A; User B and Device B; User C and Device C; and User F and (a) any Group 1 User, (b) any Group 2 User, (c) any of the wireless appliances attached to an access point on the communications network 800, (d) the server 10, or (e) the router 3. In yet still a further embodiment, the third switch 13 is yet still further programmed to prevent communications between any two Group 1 Users.

In an embodiment of the communications network 800, the router 3 is connected to an external network, as described above, via a modem 2. The communications network 800 may be located in a multi-dwelling unit building and in an embodiment the first access point 121 creates a first wireless cell providing wireless communication coverage to a first and a second unit of the multi-unit building and/or to a hallway adjacent the first unit.

Thus, in an embodiment of the present subject matter, isolation between particular users, such as two users in a multi-dwelling unit building, is user-dependent and not location-dependent. Similarly, communication/interface rights between two users are user-dependent and not location-dependent on the network access points.

As a non-limiting example, considering communications network 800 and a given set of communication/interface rights/isolations, at time $t_1$ User A (130A) and Device A (140A) are located in unit 151. User A is connected to the communications network 800 via AP1 (121) and, according to the given communication/interface rights, User A can interface with Device A which is also connected to the communications network 800 via AP1. Also at time $t_1$, User B (130B) and Device B (140B) are located in unit 152. User B is connected to the communications network 800 via AP2 (122) and, according to the given communication/interface rights, User B can interface with Device B which is also connected to the communications network 800 via AP2. However, according to the given communication/interface isolation rules, User A cannot communicate with User B nor can User A interface with Device B or User B interface with Device A.

At time $t_2$, User A and User B are each located in unit 152 and each are connected to the communication network 800 via AP2. User A can still interface with Device A even though User A is now connected to the communications network 800 via a different AP (AP2) than Device A (AP1). However, User A still cannot communicate with User B and User A still cannot interface with Device B. User B can still interface with Device B but User B still cannot interface with Device A.

At time $t_3$, User A and User B are each located in unit 153 (or, for example, in a hallway near unit 153 such that User A and User B are within range of AP3 (133)) and are connected to the communication network 800 via AP3. User A can still interface with Device A even though User A is connected to the network via a different AP (AP3) than Device A (AP1) and is serviced by a different switch (switch 3 (13)) than Device A (switch 2 (12)). User A still cannot communicate with User B and User A cannot interface with Device B (or with Device C which is connected via AP3). Nor can User A communicate with User B even though both are connected to the communication network 800 via AP3. User B can still interface with Device B and still cannot interface with Device A (or with Device C which is connected via AP3).

As a further non-limiting example, if the above given set of communication/interface rights/isolations were to allow User A to communicate with User B, then for each of the time scenarios above User A would be able to communicate with User B regardless of their respective physical locations, i.e., the AP they are using for access to the communication network 800.

As an additional non-limiting example, if the above given set of communication/interface rights/isolations were to allow User A to communicate with the server 10, then for each of the time scenarios above User A would be able to communicate with server 10 regardless of the physical location (i.e., accessing AP) of User A on the communication network 800. Furthermore, if the above given set of communication/interface rights/isolations were to allow User A to communicate with User F, then for each of the time scenarios above User A would be able to communicate with User F regardless of their respective physical locations (i.e., accessing AP) on the communication network 800. Moreover, in a further embodiment, if a function of User F is to access each of the Devices on the communication network 800 (e.g., User F is a staff employee tasked with updating/calibrating/adjusting the Devices), then regardless of the physical location (i.e., accessing AP) of User F on the communication network 800, User F would be able to access each of the Devices on the network.

Figure 9:
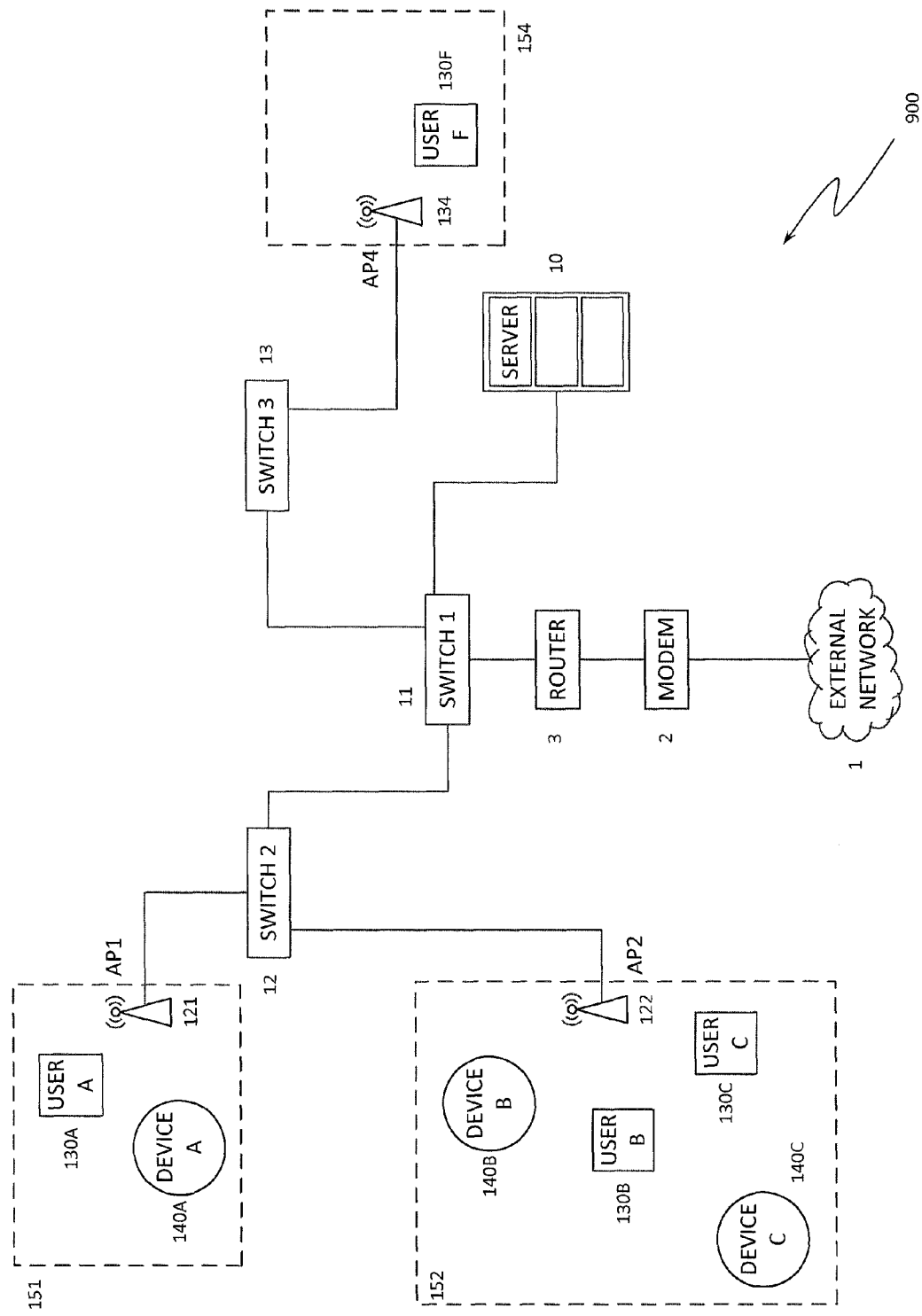
FIG. 9 is a block diagram for another topology of a communication network according to an embodiment of the present subject matter.

With attention now drawn to FIG. 9, a block diagram is presented for a topology of a communication network 900 according to an embodiment of the present subject matter. The communication network 900 connects to external network 1 (such as a wide area network, an enterprise network, the internet, or other similar network) via modem 2 and router 3, as is known in the art. The exemplary communication network 900 includes switches switch 1 (11), switch 2 (12), and switch 3 (13), connected as shown. Connected to switch 2 are AP1 (121) and AP2 (122). Connected to switch 3 is AP4 (134). Server 10 for communication network 900 is connected to switch 1 as shown. Those of skill in the art will readily understand that the topology depicted in FIG. 9 is exemplary only and in no way limits the scope of the disclosure.

AP1 services unit 151 in which user A has a mobile apparatus 130A and wireless device A (140A), such as a wirelessly-controlled appliance. AP1 may also service one or more units adjacent to unit 151 (not shown for clarity) and/or a hallway adjacent unit 151. AP2 services unit 152 in which user B has a mobile apparatus 130B and wireless device B (140B). Additionally, unit 152 includes user C who has a mobile apparatus 130C and wireless device C (140C). AP2 may also service one or more units adjacent to unit 152 (not shown for clarity) and/or a hallway adjacent unit 152. Similarly, AP4 services unit 154 in which user F has a mobile apparatus 130F. AP4 also services one or more units adjacent to unit 154 (not shown for clarity) and/or a hallway adjacent unit 154.

The communication network 900 provides communication for users in a first group ("Group 1 Users") which, in an embodiment, are hotel guests or residents in a multi-dwelling unit building, and communication for users in a second group ("Group 2 Users") which, in an embodiment, are hotel staff or staff for the owner of a multi-dwelling unit building. In FIG. 9, Group 1 Users include User A (130A), User B (130B), and User C (130C). Those of skill in the art will understand that the present disclosure is not limited to just three Group 1 Users. Group 2 Users in FIG. 9 include User F (130F) and may include additional users not shown. Additionally, communication network 900 provides communication for various digitally-controlled wireless appliances such as, but not limited to, Device A (140A), Device B (140B), and Device C (140C).

The communication network 900 includes a first switch 11 connected to a server 10, a router 3, a second switch 12, and a third switch 13. The connections between these network components may be wired or wireless. Additionally, the second switch 12 is connected to a first access point 121 and a second access point 122, either by wire or wirelessly. The third switch 13 is connected to a third access point 134, either by wire or wirelessly.

The first access point 121 is wirelessly connected to a first wireless appliance Device A (140A) and the first access point 121 can be wirelessly connected to any Group 1 User within range and at least one Group 2 User within range. The first access point 121 is programmed to allow communications at least between each of the following: User A (130A) and Device A regardless of whether User A is wirelessly connected to the first access point 121; any Group 1 User wirelessly connected to the first access point 121 and the server 10 or the router 3; and User F (a Group 2 User) and (a) any Group 1 User wirelessly connected to the first access point 121, (b) any Group 2 User wirelessly connected to the first access point 121, and (c) Device A. Additionally, the first access point 121 is programmed to prevent communications between any two Group 1 Users (e.g., User A and User B) that are both wirelessly connected to the first access point 121.

The second access point 122 is wirelessly connected to a second wireless appliance Device B (140B) and a third wireless appliance Device C (140C), and the second access point 122 can be wirelessly connected to any Group 1 User within range and at least one Group 2 User within range. The second access point 122 is programmed to allow communications at least between each of the following: User B (130B) and Device B regardless of whether User B is wirelessly connected to the second access point 122; User C (130C) and Device C regardless of whether User C is wirelessly connected to the second access point 122; any Group 1 User wirelessly connected to the second access point 122 and the server 10 or the router 3; and User F (a Group 2 User) and (a) any Group 1 User wirelessly connected to the second access point 122, (b) any Group 2 User wirelessly connected to the second access point 122, (c) Device B, and (d) Device C. Additionally, the second access point 122 is programmed to prevent communications between (a) any two Group 1 Users (e.g., User B and User C) that are both wirelessly connected to the second access point 122, (b) User B and Device C, and (c) User C and Device B.

The third access point 134 is programmed to allow communications at least between User F (130F) when User F is wirelessly connected to the third access point 134 and (a) any Group 1 User, (b) any Group 2 User, (c) any of the wireless appliances attached to an access point on the communications network 900, (d) the server 10, or (e) the router 3.

In a further embodiment of the communications network 900, the second switch 12 is further programmed to allow communications at least between each of the following: User A and Device A; User B and Device B; User C and Device C; and User F and (a) any Group 1 User, (b) any Group 2 User, (c) any of the wireless appliances attached to an access point on the communications network 900, (d) the server 10, or (e) the router 3.

In a still further embodiment of the communications network 900, the second switch 12 is still further programmed to prevent communications between any two Group 1 Users. In yet a further embodiment, the third switch 13 is yet further programmed to allow communications at least between the following: User A and Device A; User B and Device B; User C and Device C; and User F and (a) any Group 1 User, (b) any Group 2 User, (c) any of the wireless appliances attached to an access point on the communications network 900, (d) the server 10, or (e) the router 3. In yet still a further embodiment, the third switch 13 is yet still further programmed to prevent communications between any two Group 1 Users.

In an embodiment of the communications network 900, the router 3 is connected to an external network, as described above, via a modem 2. The communications network 900 may be located in a multi-dwelling unit building and in an embodiment the first access point 121 creates a first wireless cell providing wireless communication coverage to a first and a second unit of the multi-dwelling unit building and/or to a hallway adjacent the first unit.

Figure 10:
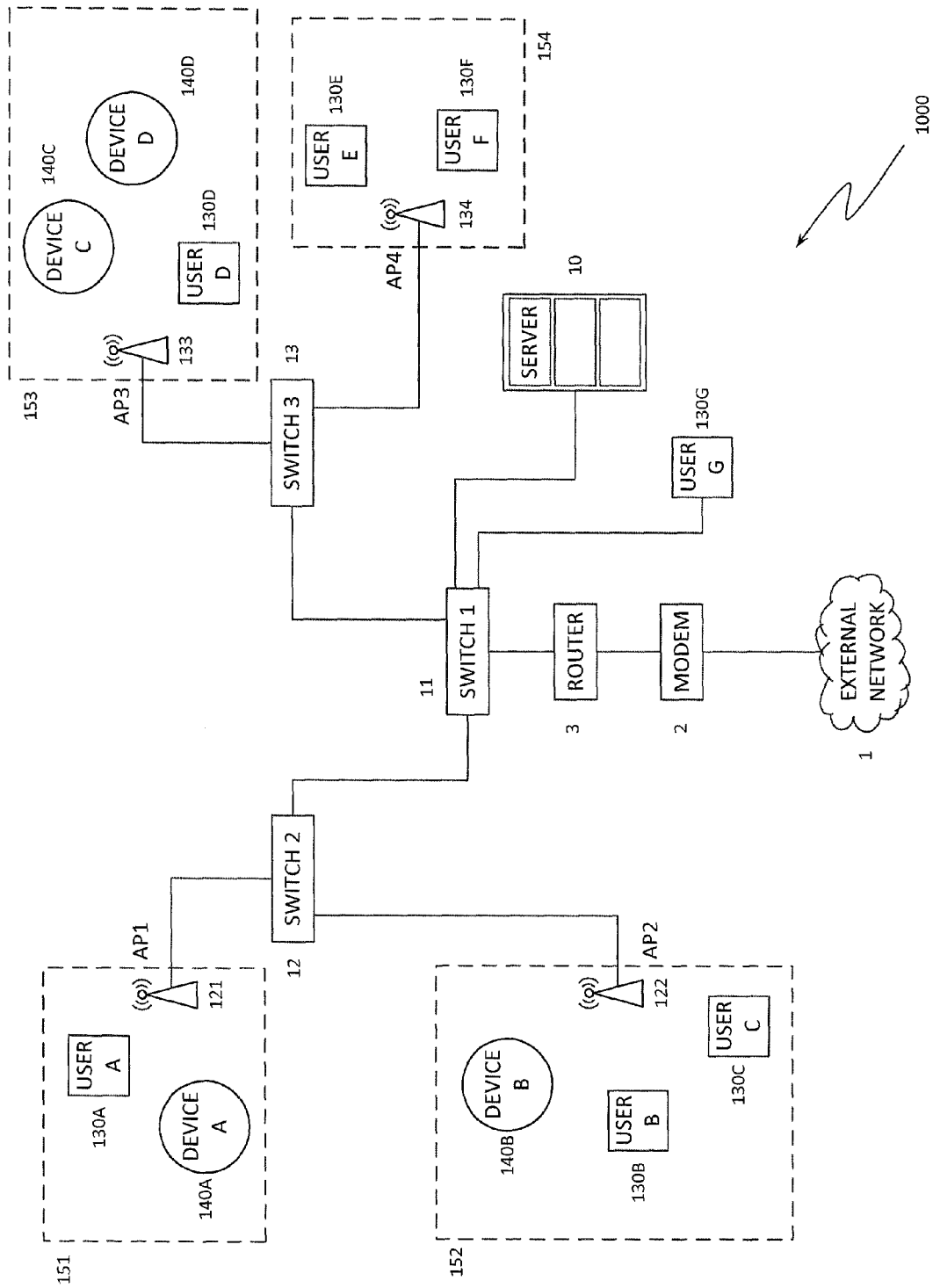
FIG. 10 is a block diagram for a further topology of a communication network according to an embodiment of the present subject matter.

Now with attention drawn to FIG. 10, a block diagram is presented for a topology of a communication network 1000 according to an embodiment of the present subject matter. The communication network 1000 connects to external network 1 (such as a wide area network, an enterprise network, the internet, or other similar network) via modem 2 and router 3, as is known in the art. The exemplary communication network 1000 includes switches switch 1 (11), switch 2 (12), and switch 3 (13), connected as shown. Connected to switch 1 is User G (130G). Connected to switch 2 are AP1 (121) and AP2 (122). Connected to switch 3 are AP3 (133) and AP4 (134). Server 10 for communication network 1000 is connected to switch 1 as shown. Those of skill in the art will readily understand that the topology depicted in FIG. 10 is exemplary only and in no way limits the scope of the disclosure.

AP1 services unit 151 in which user A has a mobile apparatus 130A and wireless device A (140A), such as a wirelessly-controlled appliance. AP1 may also service one or more units adjacent to unit 151 (not shown for clarity) and/or a hallway adjacent unit 151. AP2 services unit 152 in which user B has a mobile apparatus 130B and wireless device B (140B). Additionally, unit 152 includes user C who has a mobile apparatus 130C. AP2 may also service one or more units adjacent to unit 152 (not shown for clarity) and/or a hallway adjacent unit 152. Similarly, AP3 services unit 153 in which user D has a mobile apparatus 130D and which contains wireless device C (140C) and wireless device D (140D). AP3 may also service one or more units adjacent to unit 153 (not shown for clarity) and/or a hallway adjacent unit 153. Likewise, AP4 services unit 154 in which user E has a mobile apparatus 130E and in which user F has a mobile apparatus 130F. AP4 also services one or more units adjacent to unit 154 (not shown for clarity) and/or a hallway adjacent unit 154.

The communication network 1000 provides communication for users in a first group ("Group 1 Users") which, in an embodiment, are hotel guests or residents in a multi-dwelling unit building, and communication for users in a second group ("Group 2 Users") which, in an embodiment, are hotel staff or staff for the owner of a multi-dwelling unit building. In FIG. 10, Group 1 Users include User A (130A), User B (130B), User C (130C), and User D (130D). Those of skill in the art will understand that the present disclosure is not limited to just four Group 1 Users. Group 2 Users in FIG. 10 include User E (130E), User F (130F), and User G (130G) and may include additional users not shown. Additionally, communication network 1000 provides communication for various digitally-controlled wireless appliances such as, but not limited to, Device A (140A), Device B (140B), Device C (140C), and Device D (140D).

The communication network 1000 includes a first switch 11 connected to User G (130G), a server 10, a router 3, a second switch 12, and a third switch 13. The connections between these network components may be wired or wireless. The connection between switch 1 and User G is typically, but need not be, a wired connection. Additionally, the second switch 12 is connected to a first access point 121 and a second access point 122, either by wire or wirelessly.

The third switch 13 is connected to a third access point 133 and a fourth access point 134, either by wire or wirelessly.

The first access point 121 is wirelessly connected to a first wireless appliance Device A (140A) and the first access point 121 can be wirelessly connected to any Group 1 User within range and at least one Group 2 User within range. The first access point 121 is programmed to allow communications at least between each of the following: User A (130A) and Device A regardless of whether User A is wirelessly connected to the first access point 121; any Group 1 User wirelessly connected to the first access point 121 and the server 10 or the router 3; and User F (a Group 2 User) and (a) any Group 1 User wirelessly connected to the first access point 121, (b) any Group 2 User wirelessly connected to the first access point 121, and (c) Device A. In an embodiment, any or all of the Group 2 Users that have wireless connection capability may be treated similarly as User F. In an embodiment, the first access point 121 is programmed to allow communications at least between User G (130G) and (a) any Group 1 User wirelessly connected to the first access point 121, (b) any Group 2 User wirelessly connected to the first access point 121, and (c) Device A. Additionally, the first access point 121 is programmed to prevent communications between any two Group 1 Users (e.g., User A and User B) that are both wirelessly connected to the first access point 121.

The second access point 122 is wirelessly connected to a second wireless appliance Device B (140B) and the second access point 122 can be wirelessly connected to any Group 1 User within range and at least one Group 2 User within range. The second access point 122 is programmed to allow communications at least between each of the following: User B (130B) and Device B regardless of whether User B is wirelessly connected to the second access point 122; User C (130C) wirelessly connected to the second access point 122 and Device C (140C); any Group 1 User wirelessly connected to the second access point 122 and the server 10 or the router 3; and User F (a Group 2 User) and (a) any Group 1 User wirelessly connected to the second access point 122, (b) any Group 2 User wirelessly connected to the second access point 122, and (c) Device B. In an embodiment, any or all of the Group 2 Users that have wireless connection capability may be treated similarly as User F. In an embodiment, the second access point 122 is programmed to allow communications at least between User G (130G) and (a) any Group 1 User wirelessly connected to the second access point 122, (b) any Group 2 User wirelessly connected to the second access point 122, and (c) Device B. Additionally, the second access point 122 is programmed to prevent communications between any two Group 1 Users (e.g., User B and User C) that are both wirelessly connected to the second access point 122.

The third access point 133 is wirelessly connected to Device C (140C) and Device D (140D) and the third access point 133 can be wirelessly connected to any Group 1 User within range and at least one Group 2 User within range. The third access point 133 is programmed to allow communications at least between each of the following: User C (130C) and Device C regardless of whether User C is wirelessly connected to the third access point 133; User D (130D) and Device D regardless of whether User D is wirelessly connected to the third access point 133; any Group 1 User wirelessly connected to the third access point 133 and the server 10 or the router 3; and User F (a Group 2 User) and (a) any Group 1 User wirelessly connected to the third access point 133, (b) any Group 2 User wirelessly connected to the third access point 133, (c) Device C, and (d) Device D. In an embodiment, any or all of the Group 2 Users that have wireless connection capability may be treated similarly as User F. In an embodiment, the third access point 133 is programmed to allow communications at least between User G (130G) and (a) any Group 1 User wirelessly connected to the third access point 133, (b) any Group 2 User wirelessly connected to the third access point 133, (c) Device C, and (d) Device D. Additionally, the third access point 133 is programmed to prevent communications between any two Group 1 Users (e.g., User A and User C) that are both wirelessly connected to the third access point 133.

The fourth access point 134 is programmed to allow communications at least between User F (130F) when User F is wirelessly connected to the fourth access point 134 and (a) any Group 1 User, (b) any Group 2 User, (c) any of the wireless appliances attached to an access point on the communications network 1000, (d) the server 10, or (e) the router 3. In an embodiment, User E may be treated similarly to User F. Additionally, the fourth access point 134 is programmed to allow communications at least between User G (130G) and (a) any Group 1 User wirelessly connected to the fourth access point 134, and (b) any Group 2 User wirelessly connected to the fourth access point 134.

In a further embodiment of the communications network 1000, the second switch 12 is further programmed to allow communications at least between each of the following: User A and Device A; User B and Device B; User C and Device C; and User G and (a) any Group 1 User, (b) any Group 2 User, (c) any of the wireless appliances attached to an access point on the communications network 1000, (d) the server 10, or (e) the router 3. In an embodiment, either or both of User E and User F may be treated similarly to User G.

In a still further embodiment of the communications network 1000, the second switch 12 is still further programmed to prevent communications between any two Group 1 Users. In yet a further embodiment, the third switch 13 is yet further programmed to allow communications at least between each of the following: User A and Device A; User B and Device B; User C and Device C; and User G and (a) any Group 1 User, (b) any Group 2 User, (c) any of the wireless appliances attached to an access point on the communications network 1000, (d) the server 10, or (e) the router 3. In an embodiment, either or both of User E and User F may be treated similarly to User G. In yet still a further embodiment, the third switch 13 is yet still further programmed to prevent communications between any two Group 1 Users.

In an embodiment of the communications network 1000, the router 3 is connected to an external network, as described above, via a modem 2. The communications network 1000 may be located in a multi-dwelling unit building and in an embodiment the first access point 121 creates a first wireless cell providing wireless communication coverage to a first and a second unit of the multi-unit building and/or to a hallway adjacent the first unit.

While this specification contains many specifics, these should not be construed as limitations on the scope of the claimed subject matter, but rather as descriptions of features that may be specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

While some embodiments of the present subject matter have been described, it is to be understood that the embodiments described are illustrative only and that the scope of the invention is to be defined solely by the appended claims when accorded a full range of equivalence, many variations and modifications naturally occurring to those of skill in the art from a perusal hereof.

We claim:

1. A communication network for providing communication for a plurality of users in a first group ("Group 1 Users"), a plurality of users in a second group ("Group 2 Users"), and a plurality of digitally-controlled appliances, the communication network comprising:
    a first switch operatively connected to a server, a router, a second switch, and a third switch;
    said second switch operatively connected to a first access point and a second access point;
    said third switch operatively connected to a third access point and a fourth access point;
    said first access point wirelessly connected to a first of said plural appliances ("Device A"), wherein said first access point is programmed to allow communications between:
    a first of said Group 1 Users ("User A") and Device A regardless of whether User A is wirelessly connected to said first access point;
    any said Group 1 User wirelessly connected to said first access point and said server or said router; and
    a first of said Group 2 Users ("User F") and any said Group 1 User wirelessly connected to said first access point, any said Group 2 User wirelessly connected to said first access point, and Device A;
    and wherein said first access point is programmed to prevent communications between any two said Group 1 Users wirelessly connected to said first access point;
    said second access point wirelessly connected to a second of said plural appliances ("Device B"), wherein said second access point is programmed to allow communications between:
    a second of said Group 1 Users ("User B") and Device B regardless of whether User B is wirelessly connected to said second access point;
    a third of said Group 1 Users ("User C") wirelessly connected to said second access point and a third of said plural appliances ("Device C");
    any said Group 1 User wirelessly connected to said second access point and said server or said router; and
    User F and any said Group 1 User wirelessly connected to said second access point, any said Group 2 User wirelessly connected to said second access point, and Device B;
    and wherein said second access point is programmed to prevent communications between any two said Group 1 Users wirelessly connected to said second access point;
    said third access point wirelessly connected to Device C, wherein said third access point is programmed to allow communications between:
    User C and Device C regardless of whether User C is wirelessly connected to said third access point;
    any said Group 1 User wirelessly connected to said third access point and said server or said router; and
    User F and any said Group 1 User wirelessly connected to said third access point, any said Group 2 User wirelessly connected to said third access point, and Device C;
    and wherein said third access point is programmed to prevent communications between any two said Group 1 Users wirelessly connected to said third access point; and
    said fourth access point programmed to allow communications between User F wirelessly connected to said fourth access point and any said Group 1 User, any said Group 2 User, any of said plural appliances, said server, or said router.

2. The communication network of claim 1 wherein said second switch is programmed to allow communications between:
    User A and Device A;
    User B and Device B;
    User C and Device C; and
    User F and any said Group 1 User, any said Group 2 User, any of said plural appliances, said server, or said router.

3. The communication network of claim 2 wherein said second switch is programmed to prevent communications between any two said Group 1 Users.

4. The communication network of claim 3 wherein said third switch is programmed to allow communications between:
    User A and Device A;
    User B and Device B;
    User C and Device C; and
    User F and any said Group 1 User, any said Group 2 User, any of said plural appliances, said server, or said router.

5. The communication network of claim 4 wherein said third switch is programmed to prevent communications between any two said Group 1 Users.

6. The communication network of claim 1 wherein said router is connected to an external network via a modem.

7. The communication network of claim 1 wherein said network is located in a multi-unit building.

8. The communication network of claim 7 wherein said first access point creates a first wireless cell providing wireless communication coverage to a first and a second unit of said multi-unit building.

9. The communication network of claim 8 wherein said first wireless cell provides wireless communication coverage to a hallway adjacent said first unit.

10. The communication network of claim 1 wherein said first access point is located geographically remotely from said second access point.

11. A communication network for providing communication for a plurality of users in a first group ("Group 1 Users"), a plurality of users in a second group ("Group 2

Users"), and a plurality of digitally-controlled appliances, the communication network comprising:

a first switch operatively connected to a server, a router, a second switch, and a third switch;

said second switch operatively connected to a first access point and a second access point;

said third switch operatively connected to a third access point;

said first access point wirelessly connected to a first of said plural appliances ("Device A"), wherein said first access point is programmed to allow communications between:

a first of said Group 1 Users ("User A") and Device A regardless of whether

User A is wirelessly connected to said first access point;

any said Group 1 User wirelessly connected to said first access point and said server or said router; and a first of said Group 2 Users ("User F") and any said Group 1 User wirelessly connected to said first access point, any said Group 2 User wirelessly connected to said first access point, and Device A;

and wherein said first access point is programmed to prevent communications between any two said Group 1 Users wirelessly connected to said first access point;

said second access point wirelessly connected to a second of said plural appliances ("Device B") and a third of said plural appliances ("Device C"), wherein said second access point is programmed to allow communications between:

a second of said Group 1 Users ("User B") and Device B regardless of whether User B is wirelessly connected to said second access point;

a third of said Group 1 Users ("User C") and Device C regardless of whether User C is wirelessly connected to said second access point;

any said Group 1 User wirelessly connected to said second access point and said server or said router; and User F and any said Group 1 User wirelessly connected to said second access point, any said Group 2 User wirelessly connected to said second access point, Device B, and Device C;

and wherein said second access point is programmed to prevent communications between:

any two said Group 1 Users wirelessly connected to said second access point;

User B and Device C; and

User C and Device B;

and said third access point programmed to allow communications between User F wirelessly connected to said third access point and any said Group 1 User, any said Group 2 User, any of said plural appliances, said server, or said router.

12. The communication network of claim 11 wherein said second switch is programmed to allow communications between:

User A and Device A;
User B and Device B;
User C and Device C; and
User F and any said Group 1 User, any said Group 2 User, any of said plural appliances, said server, or said router.

13. The communication network of claim 12 wherein said second switch is programmed to prevent communications between any two said Group 1 Users.

14. The communication network of claim 13 wherein said third switch is programmed to allow communications between:

User A and Device A;
User B and Device B;
User C and Device C; and
User F and any said Group 1 User, any said Group 2 User, any of said plural appliances, said server, or said router.

15. The communication network of claim 14 wherein said third switch is programmed to prevent communications between any two said Group 1 Users.

16. The communication network of claim 11 wherein said router is connected to an external network via a modem.

17. The communication network of claim 11 wherein said network is located in a multi-unit building.

18. The communication network of claim 17 wherein said first access point creates a first wireless cell providing wireless communication coverage to a first and a second unit of said multi-unit building.

19. The communication network of claim 18 wherein said first wireless cell provides wireless communication coverage to a hallway adjacent said first unit.

20. The communication network of claim 11 wherein said first access point is located geographically remotely from said second access point.

21. A communication network for providing communication for a plurality of users in a first group ("Group 1 Users"), a plurality of users in a second group ("Group 2 Users"), and a plurality of digitally-controlled appliances, the communication network comprising:

a first switch operatively connected to a server, a router, a second switch, a third switch, and a first of said Group 2 Users ("User G");

said second switch operatively connected to a first access point and a second access point;

said third switch operatively connected to a third access point and a fourth access point;

said first access point wirelessly connected to a first of said plural appliances ("Device A"), wherein said first access point is programmed to allow communications between:

a first of said Group 1 Users ("User A") and Device A regardless of whether User A is wirelessly connected to said first access point;

any said Group 1 User wirelessly connected to said first access point and said server or said router; and User G and any said Group 1 User wirelessly connected to said first access point, any said Group 2 User wirelessly connected to said first access point, and Device A;

and wherein said first access point is programmed to prevent communications between any two said Group 1 Users wirelessly connected to said first access point;

said second access point wirelessly connected to a second of said plural appliances ("Device B"), wherein said second access point is programmed to allow communications between:

a second of said Group 1 Users ("User B") and Device B regardless of whether User B is wirelessly connected to said second access point;

a third of said Group 1 Users ("User C") wirelessly connected to said second access point and a third of said plural appliances ("Device C");

any said Group 1 User wirelessly connected to said second access point and said server or said router; and User G and any said Group 1 User wirelessly connected to said first access point, any said Group 2 User wirelessly connected to said first access point, Device B, and Device C;

and wherein said second access point is programmed to prevent communications between any two said Group 1 Users wirelessly connected to said second access point;

said third access point wirelessly connected to Device C and a fourth of said plural appliances ("Device D"), wherein said third access point is programmed to allow communications between:

User C and Device C regardless of whether User C is wirelessly connected to said third access point;

a fourth of said Group 1 Users ("User D") and Device D regardless of whether User D is wirelessly connected to said third access point;

any said Group 1 User wirelessly connected to said third access point and said server or said router; and User G and any said Group 1 User wirelessly connected to said third access point, any said Group 2 User wirelessly connected to said third access point, Device C, and Device D;

and wherein said third access point is programmed to prevent communications between any two said Group 1 Users wirelessly connected to said third access point; and said fourth access point programmed to allow communications between:

User E wirelessly connected to said fourth access point and any said Group 1 User, any said Group 2 User, any of said plural appliances, said server, or said router;

User F wirelessly connected to said fourth access point and any said Group 1 User, any said Group 2 User, any of said plural appliances, said server, or said router; and User G and any said Group 1 User wirelessly connected to said fourth access point, and any said Group 2 User wirelessly connected to said fourth access point;

and wherein said fourth access point is programmed to prevent communications between any two said Group 1 Users wirelessly connected to said fourth access point.

22. The communication network of claim 21 wherein said second switch is programmed to allow communications between:
User A and Device A;
User B and Device B;
User C and Device C; and
User G and any said Group 1 User, any said Group 2 User, any of said plural appliances, said server, or said router.

23. The communication network of claim 22 wherein said second switch is programmed to prevent communications between any two said Group 1 Users.

24. The communication network of claim 23 wherein said third switch is programmed to allow communications between:
User A and Device A;
User B and Device B;
User C and Device C; and
User G and any said Group 1 User, any said Group 2 User, any of said plural appliances, said server, or said router.

25. The communication network of claim 24 wherein said third switch is programmed to prevent communications between any two said Group 1 Users.

26. The communication network of claim 21 wherein said router is connected to an external network via a modem.

27. The communication network of claim 21 wherein said network is located in a multi-unit building.

28. The communication network of claim 27 wherein said first access point creates a first wireless cell providing wireless communication coverage to a first and a second unit of said multi-unit building.

29. The communication network of claim 28 wherein said first wireless cell provides wireless communication coverage to a hallway adjacent said first unit.

30. The communication network of claim 21 wherein said first access point is located geographically remotely from said second access point.

* * * * *